United States Patent

Nishida et al.

[11] Patent Number: 6,164,908
[45] Date of Patent: Dec. 26, 2000

[54] SEALING STRUCTURE FOR FIRST STAGE STATOR BLADE OF GAS TURBINE

[75] Inventors: Miki Nishida; Taku Ichiryu; Koichi Akagi; Hiroki Shibata; Tadakazu Sakaguchi, all of Takasago, Japan

[73] Assignee: Mitsubishi Heavy Industries, Ltd., Tokyo, Japan

[21] Appl. No.: 09/230,946

[22] PCT Filed: Jun. 4, 1998

[86] PCT No.: PCT/JP98/02477

§ 371 Date: Feb. 4, 1999

§ 102(e) Date: Feb. 4, 1999

[87] PCT Pub. No.: WO98/55737

PCT Pub. Date: Dec. 10, 1998

[30] Foreign Application Priority Data

Jun. 5, 1997 [JP] Japan .................................. 9-147735

[51] Int. Cl.[7] .................................................. F01D 5/00
[52] U.S. Cl. ...................................... 415/173.7; 415/190
[58] Field of Search .............................. 415/173.7, 209.2, 415/209.3, 209.4, 189, 190, 136, 138

[56] References Cited

U.S. PATENT DOCUMENTS 3,909,155  9/1975  Whinfrey ................................ 415/138
4,863,343  9/1989  Smed ...................................... 415/136

FOREIGN PATENT DOCUMENTS 46-37048  10/1971  Japan .
2-16305   1/1990   Japan .

Primary Examiner—Edward K. Look
Assistant Examiner—Hermes Rodriguez
Attorney, Agent, or Firm—Wenderoth, Lind & Ponack, L.L.P.

[57] ABSTRACT

A gas turbine first-stage stator blade sealing structure for preventing the sealing air from leaking from the inside even if the blade falls or inclines due to thermal stress. A rear flange (12) of a first-stage stator blade (31) is formed in an arcuate shape having a straight rib (10). A stator blade support ring (13) contacts the straight rib (10) to form a sealing face. When the rear flange (12) and the stator blade support ring (13) fall or incline relative to each other due to thermal stress during operation, the upper end or lower end of the rib (10) contacts linearly with the face of the stator blade support ring (13) so that no clearance is established to inhibit leakage of the sealing air. In the prior art, where the horizontal rib (10) is absent, an arcuate clearance is established between the stator blade support ring (13) and the rear flange (12) as the support ring (13) inclines, and thus sealing air is allowed to leak from the inside to the gas passages.

4 Claims, 6 Drawing Sheets

SEALING STRUCTURE FOR FIRST STAGE STATOR BLADE OF GAS TURBINE

BACKGROUND OF THE INVENTION

1. Technical Field

The present invention relates to a gas turbine first-stage stator blade sealing structure in which leakage of air is reduced at the stator blade of a gas turbine.

2. Description of Related Art

FIG. 10 is a general section showing an arrangement of the blades of a gas turbine. As shown, reference numeral 31 designates a first-stage stator blade, the rear flange 32 of which is fixed in contact with a stator blade support ring 33 arranged in an arcuate shape around the rotor. A plurality of stator blades 31 are arranged in contact with the stator blade support ring 33 around the rotor. Numeral 34 designates a plurality of first-stage moving blades which are arranged on a rotor disc adjacent to the stator blades 31 so that they rotate together with the rotor. Similarly, numeral 35 designates a second-stage stator blade; numeral 36 designates a second-stage moving blade; numeral 37 designates a third-stage stator blade; numeral 38 designates a third-stage moving blade; numeral 39 designates a fourth-stage stator blade; and numeral 40 designates a fourth-stage moving blade. What is shown is an example of a four-stage gas turbine which has the stator blades and the moving blades alternately arranged so that the moving blades are rotated by the hot combustion gas.

FIG. 8 is a diagram showing the details of the first-stage stator blade 31, the rear flange 32 and the stator blade support ring 33 thus far described. While the gas turbine is being run, the stator blade support ring 33 is heated and thermally deformed due to the hot working gas such that the rear flange 32 and the stator blade support ring 33 move relative to each other thereby causing a fall, as shown. Then, the contacting faces partially lose contact with each other, as will be described, to make the inner seal of the first-stage stator blade 31 insufficient so that the sealing air 40 leaks.

FIG. 9 is a view taken in the direction of arrows IX—IX of FIG. 8. The rear flange 32 is arcuate along the stator blade support ring 33. The rear flange 32 and the support ring 33 are in contact with each other in the normal state. Since the stator blade support ring 33 is also circular, however, a crescent clearance is established, as shown, when the blade relative to the ring falls. This clearance is leakage area 41, through which the sealing air leaks to thereby increasing the flow of leaking air.

In the first-stage stator blade of the prior art gas turbine, as described hereinbefore, when the rear flange 32 of the stator blade 31 and the stator blade support ring 33 fall relative to each other due to the thermal stress during the operation of the turbine, there is established between the contacting faces of the two a clearance, through which the inside sealing air leaks so as to increase the leakage air. The leakage air is uselessly released to the combustion gas thereby deteriorating the performance of the gas turbine. Therefore, it has been desired to improve the sealing structure of especially the first-stage stator blade.

SUMMARY OF THE INVENTION

Therefore, a fundamental object of the present invention is to provide a gas turbine first-stage stator blade sealing structure in which the structure of the contacting portions of the flange of a first-stage stator blade and the stator blade support ring is constructed so as to eliminate the aforementioned leakage of sealing air so that no clearance can be established between the contacting faces of the ring and the flange even if they incline relative to each other due to the thermal stress, thereby preventing the sealing air from leaking from the inside to the outside.

In order to achieve the above-specified object, according to the present invention, the following two means (1) and (2) are provided.

(1) A gas turbine first-stage stator blade sealing structure comprising: a stator blade support ring arranged around a rotor; and a flange having an arcuate side face contacting the circumferential side face of the stator blade support ring and fixing a stator blade. A straight ridge is formed on the arcuate side face of the flange and is held in contact with the side face of the stator blade support ring.

(2) A gas turbine first-stage stator blade sealing structure comprising: a stator blade support ring arranged around a rotor; and a flange having an arcuate side face contacting the circumferential side face of the stator blade support ring and fixing a stator blade. The flange is partially cut away straight at its two arcuate lower end portions so as to contact the stator blade support ring. Also, the stator blade support ring is partially cut away straight at its circumferential end portions so as to contact the flange side face.

According to the means (1) of the present invention, when the stator blade flange and the stator blade support ring deform relative to each other due to thermal deformation during the operation of the gas turbine so that the blade inclines, the side face of the stator blade support ring is in contact with the upper end or lower end of the ridge, and the ridge is straight, although the flange of the stator blade is arcuate, so that it maintains a linear contact with the side face of the stator blade support ring, and thus, no clearance is established. As a result, the sealing faces can be retained without any leakage of sealing air from the inside of the first-stage stator blade. In the prior art, the two side faces of the arcuate flange and the circular stator blade support ring are in direct contact so that the arcuate clearance is established at the contacting portions, when the two incline relative to each other, thereby causing leakage of the sealing air. According to the means (1) of the invention, however, that clearance is not established so that the air leakage can be prevented.

According to the means (2) of the invention, when the stator blade flange and the stator blade support ring deform relative to each other due to the thermal deformation during the operation of the gas turbine so that the blade inclines, the two flange end portions and the stator blade support ring circumferential end portions are partially cut away straight at their portions in order to contact each other. As a result, even if the side face of the stator blade support ring inclines either forward or backward with respect to the flange, a straight line of contact is maintained between the upper end portion of the side face and the side face of the flange or between the side face of the stator blade support ring and the cut away upper end portion of the flange, and thus, no clearance is established. Like the aforementioned means (1) of the present invention, it is possible to prevent leakage of the sealing air from the inside of the first-stage stator blade.

DETAILED DESCRIPTION OF THE INVENTION

Figure 1:
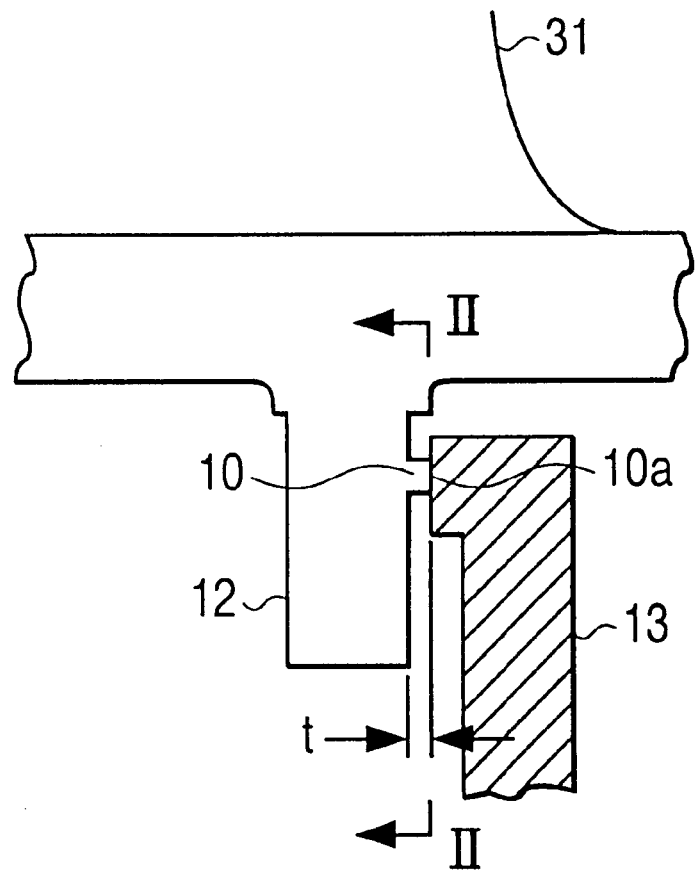
FIG. 1 is a side elevation of a gas turbine first-stage stator blade sealing structure according to a first embodiment of the invention.
Figure 2:
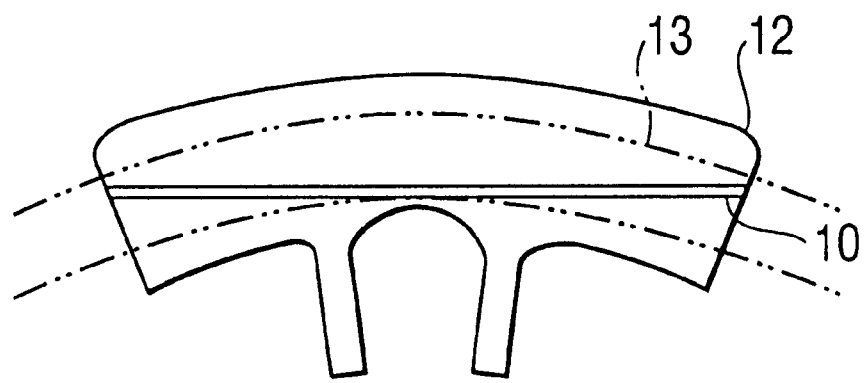
FIG. 2 is a view taken in the direction of arrows II—II of FIG. 1.

Embodiments of the present invention will be specifically described with reference to the accompanying drawings. FIG. 1 is a side elevation of a gas turbine first-stage stator blade sealing structure according to a first embodiment of the invention, and FIG. 2 is a view taken in the direction of arrows II—II of FIG. 1. In these two figures, a rear flange 12 of a first-stage stator blade 31 is formed in an arcuate shape along the circular shape of a stator blade support ring 13 and is provided on its side face with a straight rib 10.

The rib 10 is formed so as to be straight on the arcuate rear flange 12, as shown in FIG. 2, and its thickness t is determined depending upon the relative blade fall due to the thermal deformation between the rear flange 12 and the stator blade support ring 13. In this embodiment, the thickness t is set at about 2 mm and may be at least about 2 mm considering the maximum fall due to the thermal deformation. The stator blade support ring 13 contacts the straight rib 10 to retain the horizontal sealing face 10a of the rib 10.

Figure 3:
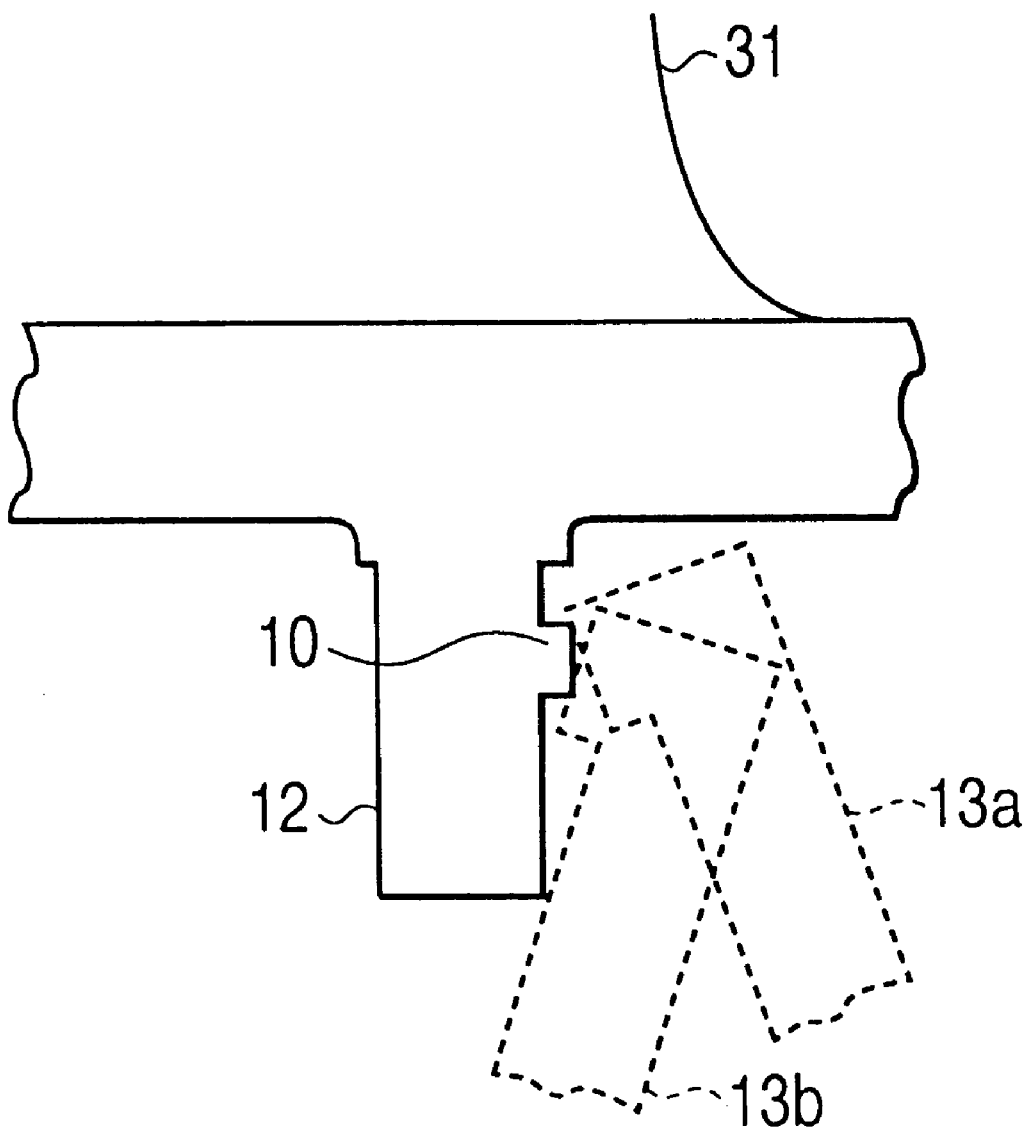
FIG. 3 is a side elevation showing the gas turbine first-stage stator blade sealing structure according to the first embodiment of the invention and explains the action of the same.

FIG. 3 is a diagram showing a case in which a relative fall occurs due to the thermal stress between the rear flange 12 and the stator blade support ring 13 in the sealing structure of the first embodiment. As shown in broken lines, the stator blade support ring 13 is relatively inclined leftward, as indicated by 13a, or rightward, as indicated by 13b. Even if the stator blade support ring 13 is inclined, as indicated by 13a or 13b, it still maintains contact with the upper end or lower end of the rib 10. In this case, the rib 10 is mounted straight, as shown in FIG. 2, so that the sealing face 10a and the stator blade support ring 13 are held in straight or linear contact along a horizontal line to maintain the seal without developing any clearance.

Figure 4:
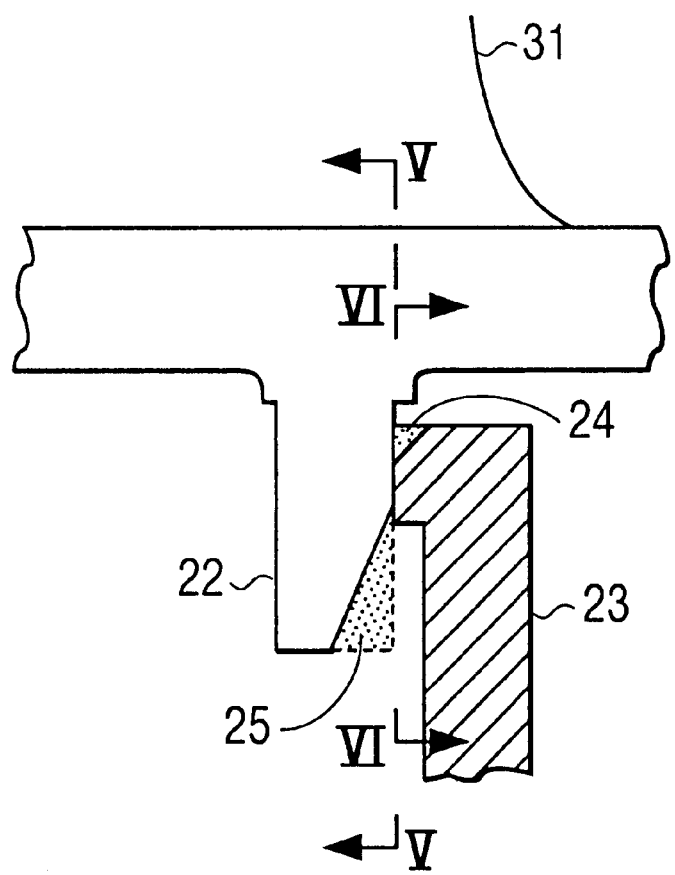
FIG. 4 is a side elevation of a gas turbine first-stage stator blade sealing structure according to a second embodiment of the invention.
Figure 5:
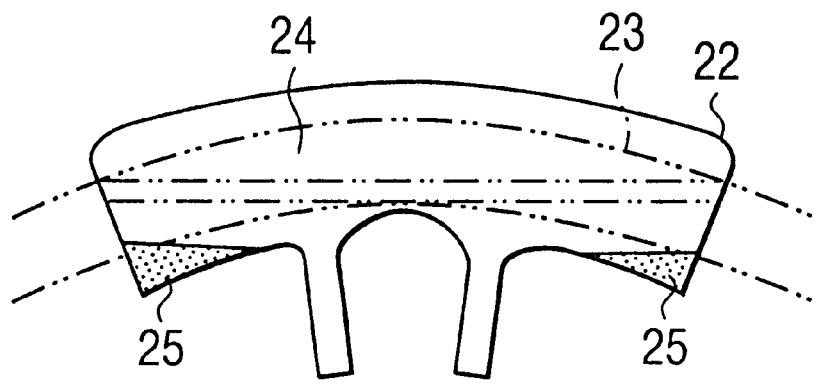
FIG. 5 is a view taken in the direction of arrows V—V of FIG. 4.
Figure 6:
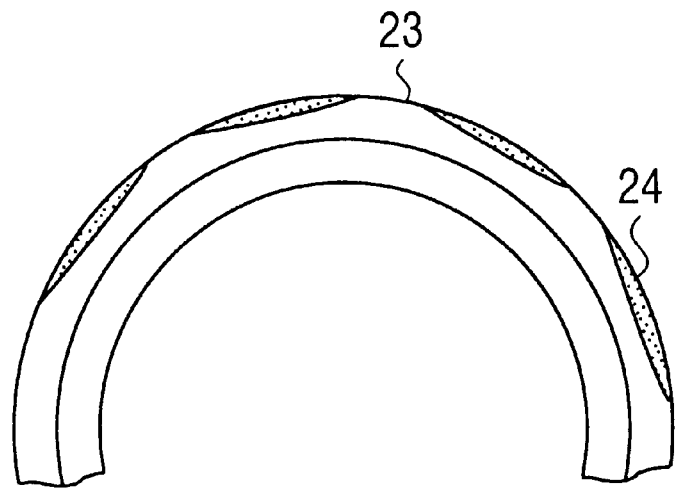
FIG. 6 is a view taken in the direction of arrows VI—VI of FIG. 4.

FIG. 4 is a side elevation of a gas turbine first-stage stator blade sealing structure according to a second embodiment of the invention; FIG. 5 is a view taken in the direction of arrows V—V of FIG. 4; and FIG. 6 is a view taken in the direction of arrows VI—VI of FIG. 4. In the second embodiment, as shown in FIG. 4, a rear flange 22 is cut away so as to abut against the lower end portion of a stator blade support ring 23, thereby forming relief portions 25. These relief portions 25 are formed by cutting away the lower end portions of the two sides of the arcuate rear flange 22, as shown in FIG. 5.

FIG. 6 is a view of the stator blade support ring 23, as taken in the direction of arrows VI—VI. The circumferential end of the circular support ring 23 are cut away so as to abut against the rear flange 22 of the stator blade 31, and to form relief portions 24. Thus, the relief portions 24 are formed in the stator blade support ring 23 whereas the relief portions 25 are formed in the rear flange 22, so that the contact of the sealing face is maintained even when the rear flange 22 and the stator blade support ring 23 fall relative to each other, as will be described hereinafter.

Figure 7:
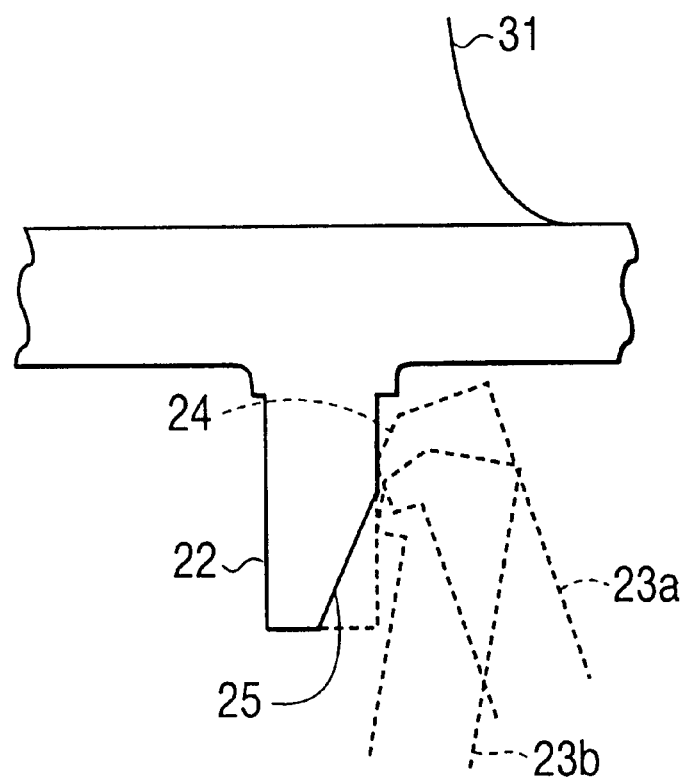
FIG. 7 is a side elevation showing the gas turbine first-stage stator blade sealing structure according to the second embodiment of the invention and explains the action of the same.
Figure 8:
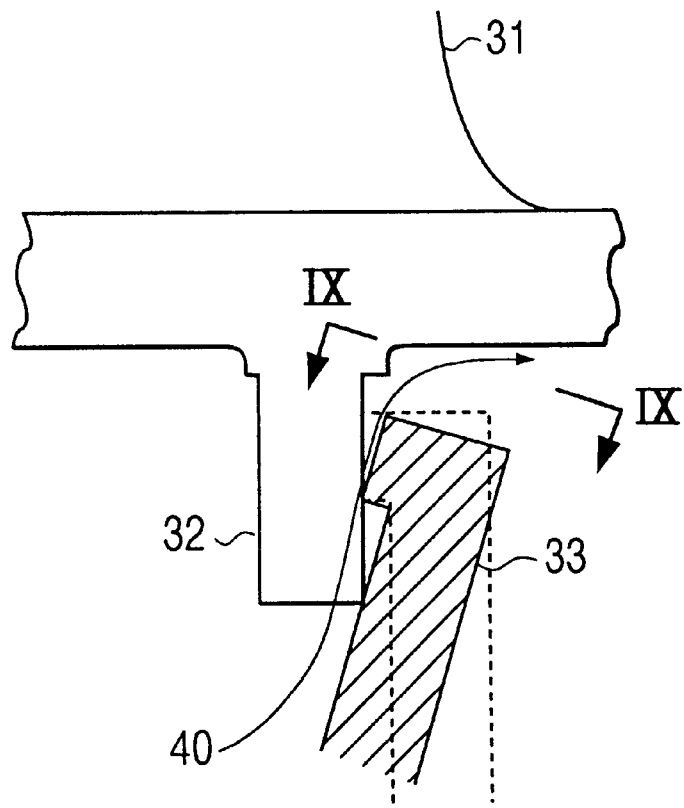
FIG. 8 is a side elevation of a prior art gas turbine first-stage stator blade sealing structure.

FIG. 7 shows the sealing structure of the second embodiment of the invention, in which the rear flange 22 and the stator blade support ring 23 fall relative each other due to the thermal stress. When the stator blade support ring inclines leftward, as indicated by broken lines 23a, its relief portions 24 abut against the rear flange 22. These relief portions 24 are formed straight, as shown in FIGS. 5 and 6, and their abutting portions contact straight closely with the central portion of the face of the arcuate rear flange 22 so that the sealing face is retained with no clearance.

Figure 9:
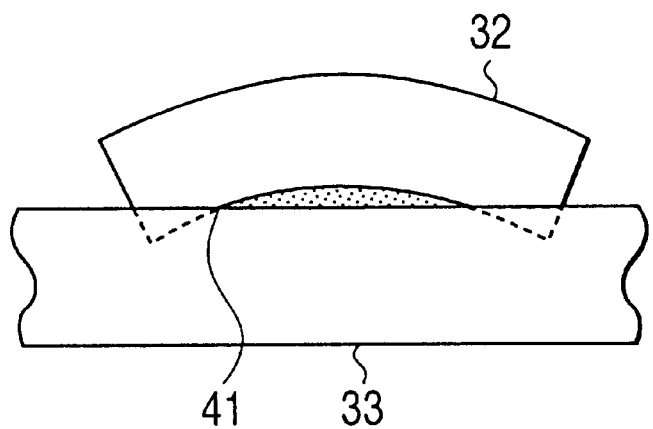
FIG. 9 is a view taken in the direction of arrows IX—IX of FIG. 8.
Figure 10:
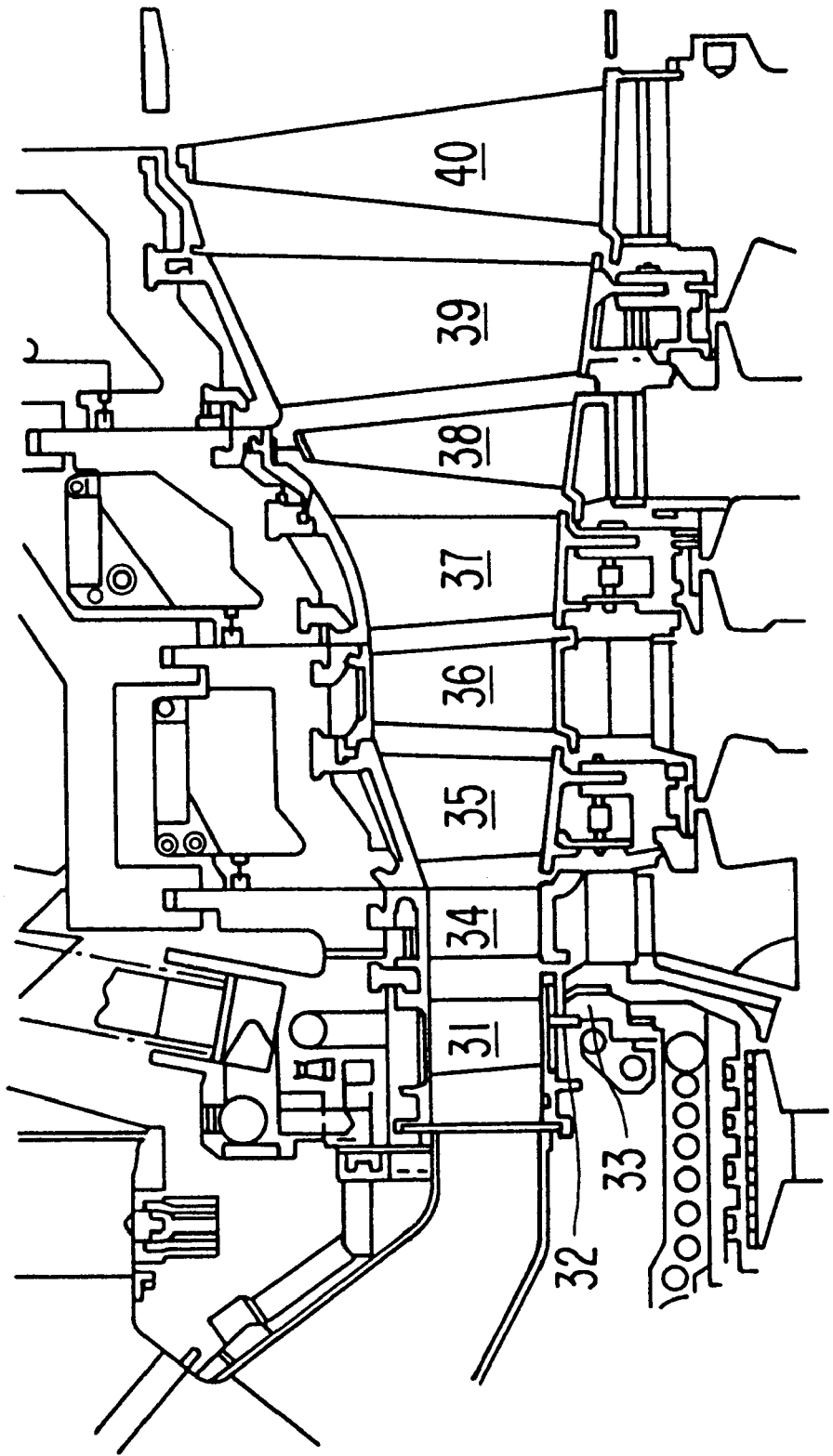
FIG. 10 is a side elevation of the inside of a prior art gas turbine.

When the stator blade support ring 23 inclines rightward, as indicated by dotted lines 23b in FIG. 7, the central portion of the stator blade support ring 23 contacts linearly with the rear flange 22, as shown in FIG. 5, while avoiding the relief portions 25 at the two end portions, so that an arcuate leakage area 41, such as that shown in FIG. 9, is not formed. As a result, no clearance is formed between the stator blade support ring 23 and the rear flange 22, and thereby the sealing face is maintained.

According to the first and second embodiments thus far described, there is adopted either the sealing structure, in which the rear flange 12 is made by forming the straight rib 10 on the rear flange of the stator blade 31, or the sealing structure in which the rear flange 22 having the relief portions 25 and the stator blade support ring 23 having the relief portions 24 are combined. As a result, even if the first-stage stator blade 31 relatively falls or inclines due to the thermal stress, the sealing face can be reliably maintained without any clearance developing on the contacting faces thereby preventing the sealing air from leaking from the inside.

What is claimed is:

1. A gas turbine first-stage stator blade sealing structure comprising:

a rotor;
   a stator blade support ring arranged around said rotor; and
   a stator blade including a flange having an arcuate side face contacting a circumferential side face of said stator blade support ring, said flange having a straight ridge formed on the arcuate side face of said flange, and is held in contact with the circumferential side face of said stator blade support ring.

2. A gas turbine first-stage stator blade sealing structure comprising:

a stator blade;
   a stator blade support ring arranged around a rotor and having a circumferential side face; and
   a flange connected to said stator blade and having an arcuate side face contacting the circumferential side face of said stator blade support ring, said flange being partially cut away straight at two arcuate lower end portions of said flange in order to contact said stator blade support ring,
   wherein said stator blade support ring is partially cut away straight at circumferential end portions thereof to permit contact with said arcuate side face of said flange.

3. A gas turbine first-stage stator blade sealing structure as claimed in claim 2, wherein said stator blade support ring is positioned relative to said flange so that the cut away portions of said stator blade support ring contact a central portion of the arcuate side face of said flange upon tilting of said stator blade support ring relative to said flange.

4. A gas turbine first-stage stator blade sealing structure as claimed in claim 2, wherein the cut away portions of said stator blade support ring are spaced along the perimeter of said stator blade support ring.

* * * * *

UNITED STATES PATENT AND TRADEMARK OFFICE
CERTIFICATE OF CORRECTION

PATENT NO. : 6,164,908
DATED : December 26, 2000
INVENTOR(S) : Nishida et al.

It is certified that error appears in the above-identified patent and that said Letters Patent is hereby corrected as shown below:

Column 4,
Line 50, before "and", insert -- wherein said straight ridge has a square cross sectional shape --.

Signed and Sealed this

Twenty-fifth Day of February, 2003

JAMES E. ROGAN
*Director of the United States Patent and Trademark Office*